US011900095B2

(12) United States Patent
Kim

(10) Patent No.: US 11,900,095 B2
(45) Date of Patent: Feb. 13, 2024

(54) VEHICLE AND METHOD OF CONTROLLING THE SAME

(71) Applicants: Hyundai Motor Company, Seoul (KR); Kia Corporation, Seoul (KR)

(72) Inventor: Jin Kim, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 147 days.

(21) Appl. No.: 17/567,714

(22) Filed: Jan. 3, 2022

(65) Prior Publication Data

US 2022/0308856 A1 Sep. 29, 2022

(30) Foreign Application Priority Data

Mar. 24, 2021 (KR) .................... 10-2021-0037938

(51) Int. Cl.
*G06F 8/65* (2018.01)
*G01C 21/34* (2006.01)
*G07C 5/00* (2006.01)
*G06F 8/71* (2018.01)

(52) U.S. Cl.
CPC ........... *G06F 8/65* (2013.01); *G01C 21/3469* (2013.01); *G06F 8/71* (2013.01); *G07C 5/008* (2013.01)

(58) Field of Classification Search
None
See application file for complete search history.

(56) References Cited

U.S. PATENT DOCUMENTS

| 11,669,640 | B1* | 6/2023 | Gibson | G06F 21/64 |
| | | | | 726/26 |
| 2009/0132118 | A1* | 5/2009 | Takeda | H04L 12/40013 |
| | | | | 701/1 |
| 2017/0158225 | A1* | 6/2017 | Brown | B62D 15/021 |
| 2019/0210545 | A1* | 7/2019 | Sangameswaran | ... B60R 16/033 |
| 2019/0212997 | A1* | 7/2019 | Sangameswaran | ..... H04L 67/52 |
| 2019/0294431 | A1* | 9/2019 | Saito | G06F 11/00 |
| 2020/0050442 | A1* | 2/2020 | Sakurai | H04L 67/12 |
| 2020/0125355 | A1* | 4/2020 | Aust | G06F 8/65 |
| 2020/0393259 | A1* | 12/2020 | Gantt, Jr. | B60L 53/65 |
| 2021/0311724 | A1* | 10/2021 | Ishikawa | G06F 8/654 |
| 2021/0345076 | A1* | 11/2021 | Lee | H04W 8/245 |
| 2021/0403014 | A1* | 12/2021 | Bunazawa | B60K 6/445 |

(Continued)

FOREIGN PATENT DOCUMENTS

| CN | 113504921 A | * | 10/2021 |
| CN | 115769232 A | * | 3/2023 |

(Continued)

*Primary Examiner* — Philip Wang
(74) *Attorney, Agent, or Firm* — MORGAN, LEWIS & BOCKIUS LLP

(57) ABSTRACT

A method of controlling a vehicle for stably performing over-the-air (OTA) software updates by fully considering a power supply status of the vehicle includes: determining a power supply status of the vehicle; determining whether to enable supply of an electric power higher than a value required to perform an over-the-air (OTA) software update of the vehicle based on the power supply status of the vehicle; and performing the OTA software update of the vehicle upon determining that the supply of the electric power higher than the value required to perform the OTA software update of the vehicle is possible.

18 Claims, 6 Drawing Sheets

(56) References Cited

U.S. PATENT DOCUMENTS

| | | | | |
|---|---|---|---|---|
| 2023/0152769 A1* | 5/2023 | Galin | .................. | H04L 67/12 |
| | | | | 700/297 |
| 2023/0175581 A1* | 6/2023 | Balistreri | ............... | B60K 23/08 |
| | | | | 701/69 |
| 2023/0229026 A1* | 7/2023 | Mansouri | .............. | G02F 1/0121 |
| | | | | 385/2 |
| 2023/0231640 A1* | 7/2023 | Balevi | .................. | H04B 7/0417 |
| | | | | 370/329 |

FOREIGN PATENT DOCUMENTS

| | | | | | |
|---|---|---|---|---|---|
| CN | 115794148 | A | * | 3/2023 | |
| DE | 102019131474 | A1 | * | 12/2020 | ........... B60R 16/033 |
| EP | 4099655 | A1 | * | 12/2022 | ............. G06F 8/658 |
| JP | 2018148642 | A | * | 9/2018 | |
| JP | 2022024746 | A | * | 2/2022 | ............... G06F 8/65 |

\* cited by examiner

FIG. 4

402: VEHICLE-SPECIFIC POWER CONSUMPTION INFORMATION

| TEMPERATURE | [a] AVERAGE POWER CONSUMPTION DURING PARKING | [b] AVERAGE POWER CONSUMPTION DURING STANDBY | [g] ALTERNATOR MARGIN |
|---|---|---|---|
| LOW TEMPERATURE | 2A | 3A | 20% |
| ROOM TEMPERATURE | 3A | 3A | 30% |
| HIGH TEMPERATURE | 4A | 2A | 10% |

404: BATTERY CHARGE LEVEL INFORMATION

| [c] CURRENT TEMPERATURE | [d] CURRENT CHARGE LEVEL (SOC) |
|---|---|
| ROOM TEMPERATURE | 80% |

FIG. 5

502: VEHICLE CHARGE TARGET SETTING INFORMATION

| TEMPERATURE | [e] OTA-ENABLING SOC/ ALTERNATOR MARGIN |
|---|---|
| LOW TEMPERATURE | 70% / 10% |
| ROOM TEMPERATURE | 60% / 20% |
| HIGH TEMPERATURE | 50% / 5% |

504: ECU COMMUNICATION/POWER INFORMATION

| | ECU OF ENTIRE VEHICLE | COMMUNICATIONEL CHANN | ECU POWER CONSUMPTION DURING PARKING | ECU POWER CONSUMPTION DURING STANDBY | [f] ECU POWER CONSUMPTION DURING DRIVING |
|---|---|---|---|---|---|
| 1 | ECU1 | C1, C2, C3 | 0.5mA | 5mA | 1A |
| 2 | ECU2 | C1, C3 | 0.1mA | 0.1mA | 0.4A |
| 3 | ECU3 | C2, C3 | 0.05mA | 1mA | 2A |
| 4 | ... | ... | ... | ... | ... |

506: COMMUNICATION CHANNEL-SPECIFIC CONNECTED ECU INFORMATION

| ECU CONNECTED TO CHANNEL C1 | SELECTIVE (PARTIAL) FUNCTION | ECU CONNECTED TO CHANNEL C2 | SELECTIVE (PARTIAL) FUNCTION |
|---|---|---|---|
| ECU1 | O | ECU1 | X |
| ECU4 | X | ECU2 | O |
| ECU5 | O | ECU7 | O |
| ... | ... | ... | ... |

VEHICLE AND METHOD OF CONTROLLING THE SAME

CROSS-REFERENCE TO RELATED APPLICATION

The present application claims priority to Korean Patent Application No. 10-2021-0037938, filed on Mar. 24, 2021 the entire contents of which is incorporated herein for all purposes by this reference.

BACKGROUND OF THE INVENTION

Field of the Invention

The present invention relates to a vehicle and a method of controlling a software update of the vehicle.

Description of Related Art

A multimedia device implemented as a system in which an audio device, a video device, a navigation device, and the like are integrated has been standard equipment in recently launched vehicles.

Furthermore, in addition to the multimedia device, vehicles are provided with a body control module (BCM) configured to automatically control memory seats, a position of a room mirror, positions of side mirrors, and the like, a chassis control unit related to the control of steering, suspension, and brakes, a power train control unit (transmission control unit (TCU)) configured to control a transmission, and an engine control unit (ECU) configured to control an engine.

Automotive parts are provided with software (or firmware) to drive each system, and the software is updated to new versions to improve performance.

Because such software update takes a long time or is impossible while driving, users often postpone the software update. To overcome such disadvantages, scheduled updates or updates conducted late at night are provided. However, in the case of the scheduled update, a remaining amount of a battery needs to be considered.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to stably performing over-the-air software updates by fully considering a power supply status of a vehicle.

Various aspects of the present invention provide a method of controlling a vehicle, the method including: determining a power supply status of the vehicle; determining whether to enable supply of an electric power higher than a value required to perform an over-the-air (OTA) software update of the vehicle based on the power supply status of the vehicle; and performing the OTA software update of the vehicle upon determining that the supply of the electric power higher than the value required to perform the OTA software update of the vehicle is possible.

In the method, the performing of the OTA software update of the vehicle may include allowing an automatic OTA software update of the vehicle upon determining that supply of an additional electric power higher than the value required to perform the OTA software update of the vehicle by a predetermined level is possible.

In the method, the performing of the OTA software update of the vehicle may include allowing the OTA software update of the vehicle only when forced execution of the OTA software update is selected upon determining that the electric power required to perform the OTA software update of the vehicle is obtained but the supply of the additional electric power higher by the predetermined level is impossible.

The method may further include not performing the OTA software update of the vehicle upon determining that the supply of the electric power required to perform the OTA software update of the vehicle is impossible.

In the method, the determining of the power supply status of the vehicle may be performed based on a charge level of a battery of the vehicle and a generated amount of electric power of an alternator.

In the method, the electric power required to perform the OTA software update of the vehicle may be determined based on a designed value-based estimated power consumption and an actually measured value-based power consumption of a target device of the OTA software update of the vehicle.

In the method, the actually measured value-based power consumptions may be determined in a pre-set plurality of temperature sections based on an average battery consumption during parking, an average battery consumption during standby, and an alternator margin of the vehicle.

In the method, the electric power required to perform the OTA software update of the vehicle may include an amount of electric power consumed when the target device of the OTA software update of the vehicle is driven by the updated software after the OTA software update is completed.

Various aspects of the present invention provide a vehicle including: an alternator configured to generate electric power; a battery configured to store the electric power; and a controller configured to determine a power supply status of the vehicle, determine whether to enable supply of an electric power higher than a value required to perform an over-the-air (OTA) software update of the vehicle based on the power supply status of the vehicle, and perform the OTA software update of the vehicle upon determining that the supply of the electric power higher than the value required to perform the OTA software update of the vehicle is possible.

In the vehicle, the OTA software update of the vehicle may be performed by allowing an automatic OTA software update of the vehicle upon determining that supply of an additional electric power higher than the value required to perform the OTA software update of the vehicle by a predetermined level is possible.

In the vehicle, the OTA software update of the vehicle may be performed by allowing the OTA software update of the vehicle only when forced execution of the OTA software update is selected upon determining that the electric power required to perform the OTA software update of the vehicle is obtained but the supply of the additional electric power higher by the predetermined level is impossible.

In the vehicle, the controller may be configured not to perform the OTA software update of the vehicle upon determining that the supply of the electric power required to perform the OTA software update of the vehicle is impossible.

In the vehicle, the power supply status of the vehicle may be determined based on a charge level of the battery of the vehicle and a generated amount of electric power of the alternator.

In the vehicle, the electric power required to perform the OTA software update of the vehicle may be determined on the basis of a designed value-based estimated power consumption and an actually measured value-based power consumption of a target device of the OTA software update of the vehicle.

In the vehicle, the actually measured value-based power consumptions may be determined in a pre-set plurality of temperature sections based on an average battery consumption during parking, an average battery consumption during standby, and an alternator margin of the vehicle.

In the vehicle, the electric power required to perform the OTA software update of the vehicle may include an amount of electric power consumed when the target device of the OTA software update of the vehicle is driven by the updated software after the OTA software update is completed.

Various aspects of the present invention provide a method of controlling a vehicle, the method including: determining a power supply status of the vehicle; determining whether to enable supply of an electric power higher than a value required to perform an over-the-air (OTA) software update of the vehicle based on the power supply status of the vehicle; allowing an automatic OTA software update of the vehicle upon determining that supply of an additional electric power higher than a value required to perform the OTA software update of the vehicle by a predetermined level; allowing the OTA software update of the vehicle only when forced execution of the OTA software update is selected upon determining that the electric power required to perform the OTA software update of the vehicle is obtained but the supply of the additional electric power higher by the predetermined level is impossible; and not performing the OTA software update of the vehicle upon determining that the supply of the electric power required to perform the OTA software update of the vehicle is impossible.

Various aspects of the present invention provide a vehicle including: an alternator configured to generate electric power; a battery configured to store the electric power; and a controller configured to determine a power supply status of the vehicle, determine whether to enable supply of an electric power higher than a value required to perform an over-the-air (OTA) software update of the vehicle based on the power supply status of the vehicle, allow an automatic OTA software update of the vehicle upon determining that supply of an additional electric power higher than the value required to perform the OTA software update of the vehicle by a predetermined level, allow the OTA software update of the vehicle only when forced execution of the OTA software update is selected upon determining that the electric power required to perform the OTA software update of the vehicle is obtained but the supply of the additional electric power higher by the predetermined level is impossible, and not perform the OTA software update of the vehicle upon determining that the supply of the electric power required to perform the OTA software update of the vehicle is impossible.

According to various exemplary embodiments of the present invention, over-the-air software updates may be stably conducted by fully considering a power supply status of a vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a view exemplarily illustrating an example of vehicle-specific power information of the power information server shown in FIG. 3.

FIG. 5 is a view exemplarily illustrating an example of vehicle-specific ECU power/communication specification information of the power information server shown in FIG. 3.

Figure 1:
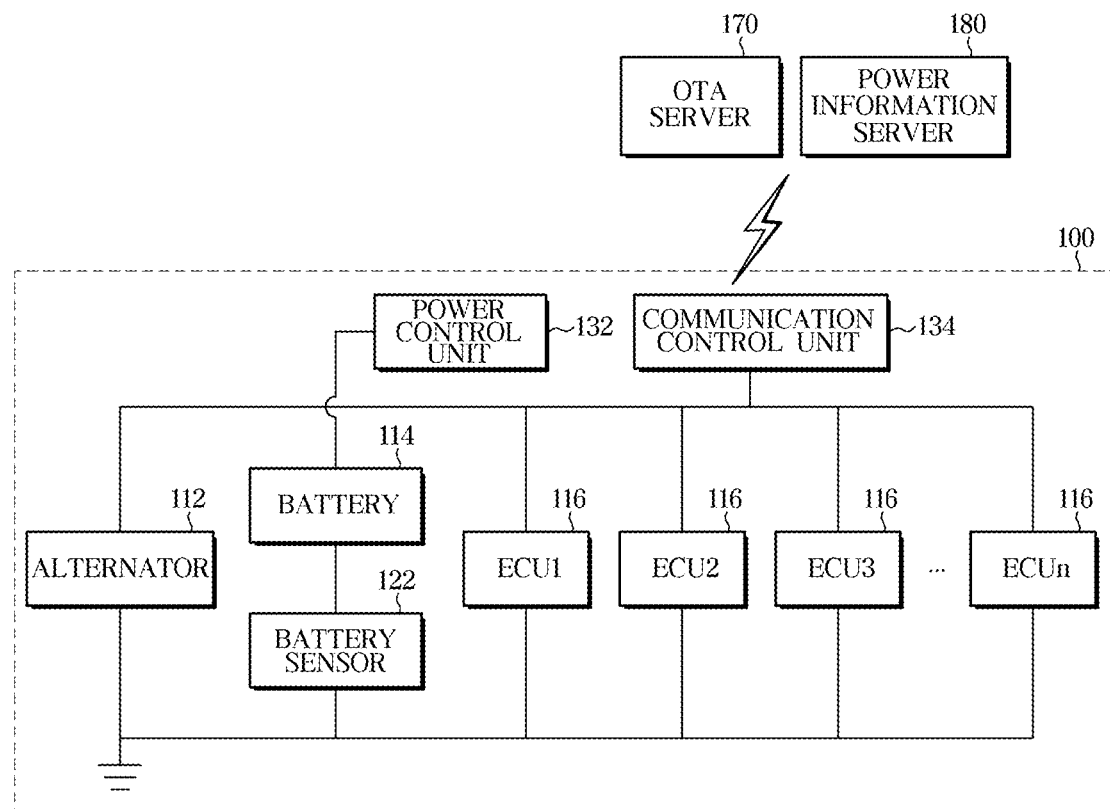
FIG. 1 is a view exemplarily illustrating a vehicle according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

FIG. 1 is a view exemplarily illustrating a vehicle according to various exemplary embodiments of the present invention.

In FIG. 1, an alternator 112 is an example of electric generators that convert a part of power generated by an engine into electrical energy while a vehicle 100 is driven. In the case of eco-friendly vehicles, the alternator 112 may be a converter configured to convert electric power. The alternator 112 generates electricity in an amount corresponding to a request of a power control unit 132, which will be described later. The electricity generated by the alternator 112 is supplied to various electrical loads of the vehicle 100.

A battery 114 is a device configured to store electric power required for starting an engine and driving the electrical loads.

At least one electronic control unit (ECU) 116 is provided to control various target elements of the vehicle 100 to be controlled, such as an air conditioner, seats, an engine, and a transmission, of the vehicle 100. In accordance with the number of the elements to be controlled, the vehicle 100 may include a plurality of ECUs 116. One ECU 116 may control two or more elements to be controlled. Alternatively, only one ECU 116 may control one element to be controlled.

A battery sensor 122 is provided to constantly monitor the state of the battery 114.

The power control unit 132 determines whether to enable supply of an electric power higher than a value required to perform an over-the-air (OTA) software update of the vehicle based on a power supply status of the vehicle, and performs the OTA software update of the vehicle upon determining that the supply of the electric power higher than the value required to perform the OTA software update of the vehicle is possible. In the OTA software update, software may include firmware.

The communication control unit 134 is provided to transmit information received from the outside via a wireless communication network into the vehicle 100. Furthermore, the communication control unit 134 is configured to transmit information of the vehicle 100 to the outside via a wireless communication network.

Figure 2:
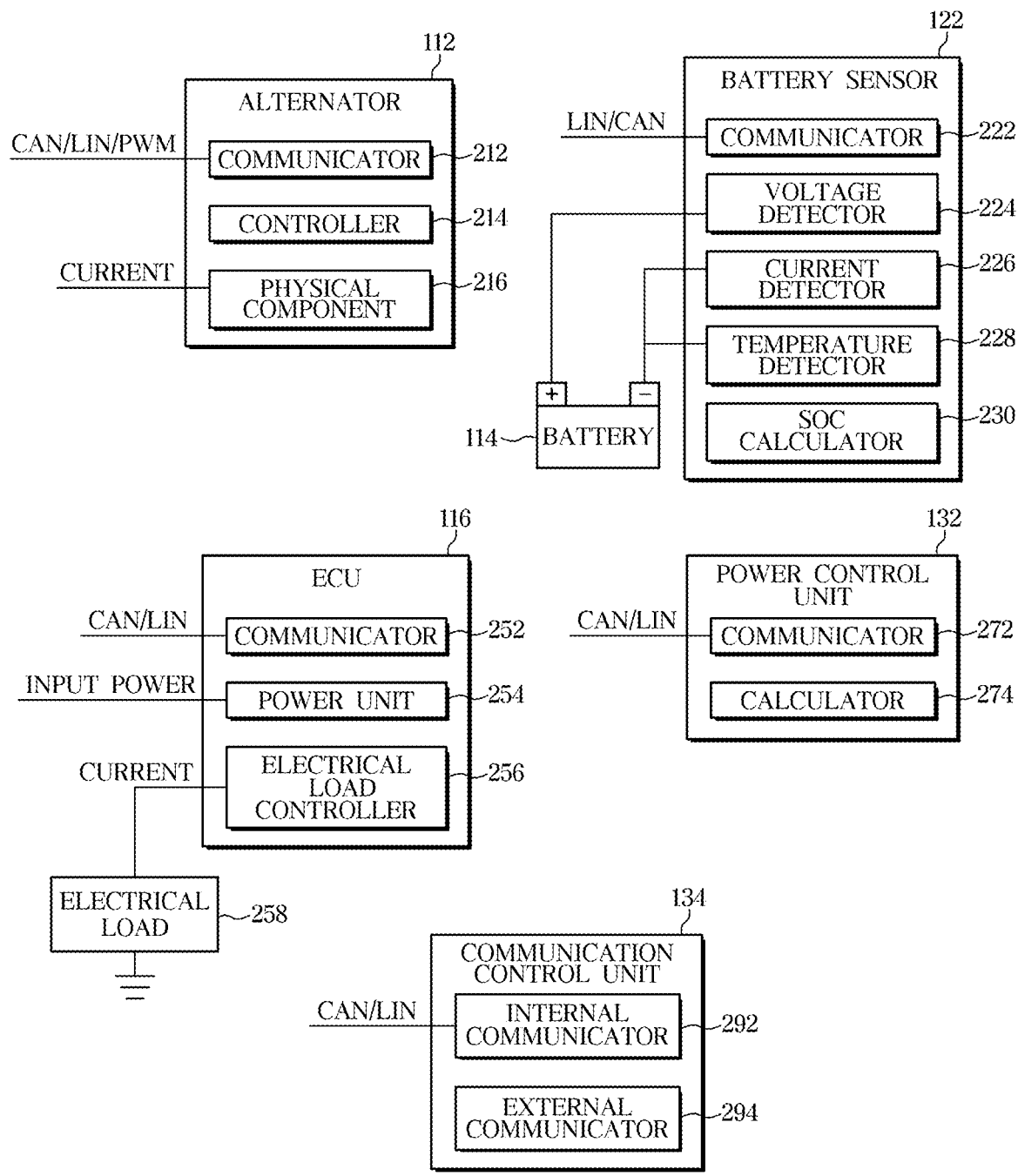
FIG. 2 is a view exemplarily illustrating structures of an alternator, a battery sensor, an ECU, a power control unit, and a communication control unit shown in FIG. 1.

FIG. 2 is a view exemplarily illustrating structures of the alternator, the battery sensor, the ECU, the power control unit, and the communication control unit shown in FIG. 1. In FIG. 2, CAN is Control Area Network, LIN is Local Interconnect Network, and PWM is Pulse Width Modulation.

The alternator 112 includes a communicator 212, a controller 214, and a physical component 216. The communicator 212 is configured to perform communication of other devices (e.g., the power control unit 132). The controller 214 performs electrical generation in response to a control command received via the communicator 212. The physical component 216 may include magnets and coils that actually generate electric power.

The battery sensor 122 includes a communicator 222, a voltage detector 224, a current detector 226, a temperature detector 228, and a state of charge (SOC) calculator 230. The communicator 222 transmits or receives information via communication with an OTA server 170 or a power information server 180. The voltage detector 224 monitors a voltage state of the battery 114. The current detector 226 monitors input/output currents of the battery 114. The temperature detector 228 monitors a liquid temperature of the battery 114. The SOC calculator 230 determines the state of charge of the battery 114 based on information on the voltage, current, and temperature of the battery 114.

Each of the at least one ECU 116 includes a communicator 252, a power unit 254, and an electrical load controller 256. The communicator 252 is provided to communicate with the other devices of the vehicle 100. For example, the communicator 252 may receive an electrical load control signal from the power control unit 132. The power unit 254 receives an electric power from the battery 114 and detects a voltage of the received electric power. The electrical load controller 256 controls an output of an electrical load 258. The electrical load 258 may include any devices that consume the electric power among the devices included in the vehicle 100 according to various exemplary embodiments of the present invention.

The power control unit 132 includes a communicator 272 and a calculator 274. The communicator 272 is configured to communicate with other devices of the vehicle 100. The calculator 274 is configured to perform various determinations for determining or predicting power consumptions of various devices of the vehicle 100.

The communication control unit 134 includes an internal communicator 292 and an external communicator 294. The internal communicator 292 is provided for communication among various devices in the vehicle 100. For example, the internal communicator 292 may enable mutual communication of the alternator 112 with the battery 114, the battery sensor 122, the at least one ECU 116, the power control unit 132, and the communication control unit 134 shown in FIG. 1. The external communicator 294 is provided to communicate with external devices. For example, the external communicator 294 enables mutual communication of the vehicle 100 with the OTA server 170 and the power information server 180. A wireless communication network technology may be used in the mutual communication of the vehicle 100 with the OTA server 170 and the power information server 180. As the wireless communication network technology, a 3G network or an LTE network may be used.

Figure 3:
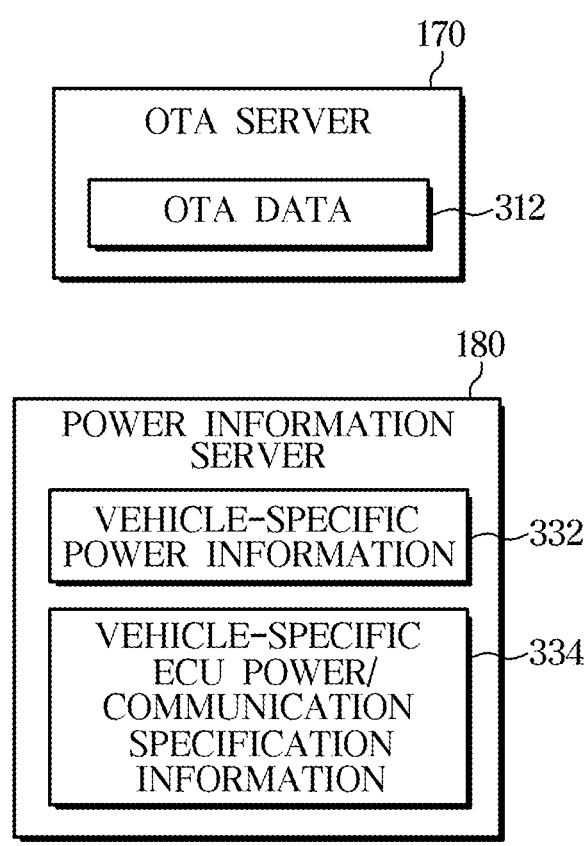
FIG. 3 is a view exemplarily illustrating structures of an OTA server and a power information server shown in FIG. 1.

FIG. 3 is a view exemplarily illustrating structures of the OTA server and the power information server shown in FIG. 1.

As shown in FIG. 3, the OTA server 170 stores OTA data 312. The OTA data 312 is data for updating software (or firmware) of the at least one ECU 116 of the vehicle 100 by the OTA method.

The power information server 180 stores and manages vehicle-specific power information 332 and vehicle-specific ECU power/communication specification information 334. The vehicle-specific power information 332 may include information such as vehicle-specific power consumptions and battery charge levels. The vehicle-specific ECU power/communication specification information 334 may include vehicle charge target setting information, ECU communication/power information, and communication channel-specific connected ECU information of vehicles. Such information used in the power information server 180 will be described in detail with reference to FIG. 4 and FIG. 5 below.

FIG. 4 is a view exemplarily illustrating an example of the vehicle-specific power information of the power information server shown in FIG. 3.

As described above in the descriptions provided above with reference to FIG. 3, the power information server 180 may store and manage the vehicle-specific power information 332 and the vehicle-specific ECU power/communication specification information 334, and the vehicle-specific power information 332 may include information such as vehicle-specific power consumption and battery charge levels.

Vehicle-specific power consumption information 402 forming the vehicle-specific power information 332 includes information on power consumption of the vehicle 100 registered in the power information server 180. For example, as shown in FIG. 4, the vehicle-specific power consumption information 402 is information on average battery consumption during parking of the vehicle 100 [a], average battery consumption during standby [b], and alternator margin (PWM duty) [g] respectively classified and stored according to a plurality of temperature sections (low temperature/room temperature/high temperature). The low temperature/room temperature/high temperature is obtained by classifying a certain temperature range into a plurality of sections and naming the plurality of sections. The temperature range is divided into the low temperature section from −40° C. to 0° C., the room temperature section rom 0° C. to 40° C., and the high temperature section over 40° C. The plurality of temperature sections (low temperature/room temperature/high temperature) may be set differently based on charging performance of the battery 114 and electric generation performance of the alternator 112. In this regard, the temperature is a liquid temperature of the battery 114 (temperature of a battery liquid). A maximum output (maximum generated amount of electric power) of the alternator 112 is determined according to revolutions per minute (rpm), voltage, temperature, and the like. A remaining output (generated amount of electric power) obtained by subtracting a current power consumption (required power generation) of the vehicle 100 from a current maximum output (maximum generated amount of electric power) of the alternator 112, i.e., capability margin (generated amount of electric power) is the alternator margin [g]. Whenever the vehicle 100 is driven (whenever electric power is suppled after the engine is started), a minimum charge level of the battery 114, the average battery consumption during parking [a], the average battery consumption during standby [b], and the alternator margin [g] are updated with new values. The minimum charge level of the battery 114 is a minimum charge level required to start the engine. The minimum charge level of the battery 114 is updated with the lowest value among values generated during a predetermined time period in the past. The average battery consumption during parking [a], the average battery consumption during standby [b], and the alternator margin [g] are updated with average values obtained during a predetermined time period in the past.

Furthermore, battery charge level information 404 indicates a current state of charge (SOC) value of the battery 114 of the vehicle 100. Information on the SOC value of the battery 114 detected by the battery sensor 122 of the vehicle 100 is transmitted to the power information server 180 via the communication control unit 134 of the vehicle 100 and stored in the power information server 180 as the battery charge level information 404. The battery charge level information 404 is continuously updated whenever the vehicle 100 is parked and driven. In this regard, the 'standby' of the vehicle 100 refers to a case in which a user stays in the vehicle 100 without starting the engine.

FIG. 5 is a view exemplarily illustrating an example of the vehicle-specific ECU power/communication specification information of the power information server shown in FIG. 3. The vehicle-specific ECU power/communication specification information shown in FIG. 5 is a value obtained during a design stage or a test stage of the vehicle 100 and provided to the power information server 180.

As described above in the descriptions provided above with reference to FIG. 3, the power information server 180 may store and manage the vehicle-specific power information 332 and the vehicle-specific ECU power/communication specification information 334, and the vehicle-specific ECU power/communication specification information 334 may include the vehicle charge target setting information, the ECU communication/power information, and the communication channel-specific connected ECU information.

Vehicle charge target setting information 502 forming the vehicle-specific ECU power/communication specification information 334 refers to values obtained by dividing OTA-facilitating SOCs of the vehicle 100 by the alternator margin [g] and classified and stored according to a plurality of temperature sections (low temperature/room temperature/high temperature). The OTA-facilitating SOC refers to an SOC (state of battery charge) sufficient to stably perform OTA for each vehicle. The temperature is a temperature of a battery liquid (liquid temperature) of the battery 114.

ECU communication/power information 504 includes a list of communication channels respectively connected to all ECUs 116 provided in the vehicle 100, power consumptions during parking, power consumptions during standby, and power consumptions while driving. The ECU communication/power information 504 of FIG. 5 is a designed value including a certain level of margin.

The list of communication channels refers to information indicating communication channels to which the ECUs 116 provided in the vehicle 100 are respectively connected. Because the power consumption may vary according to the communication channel, the communication channels of the ECUs 116 need to be distinguished from each other.

The power consumption during parking refers to information indicating an electric power consumed by each of the ECUs 116 provided in the vehicle 100 while the vehicle 100 is parked (engine off). The power consumption during standby refers to an electric power consumed while the vehicle 100 is in standby. The power consumption while driving refers to information indicating an electric power consumed by each of the ECUs 116 provided in the vehicle 100 while the vehicle 100 is driven (engine on). Even in the same ECU 116, the power consumption during parking, the power consumption during standby, and the power consumption while driving may be different from one another. Therefore, there is a need to distinguish the power consumption during parking, the power consumption during standby, and the power consumption while driving of each ECU 116 from one another.

Furthermore, communication channel-specific connected ECU information 506 refers to information on the ECUs 116 provided in the vehicle 100 and connected to each communication channel. The communication channel-specific connected ECU information 506 refers to information indicating communication channels connected to the ECUs 116, respectively, and include information on whether each ECU 116 has a selective wake-up (or partial wake-up) function. In the case where when a particular ECU 116 is activated, only ECUs 116 related to the activated ECU 116 are activated, the activated ECUs 116 have the selective wake-up function. On the other hand, in the case where when a particular ECU 116 is activated, the other ECUs 116 even unrelated to the activated ECU 116 are also activated, the activated ECUs 116 do not have the selective wake-up function. The communication channel-specific connected ECU information 506 is used to confirm whether a particular ECU 116 operates alone or whether a particular ECU 116 needs to operate under a cooperative control with other ECUs 116. This is because power consumption of each ECU 116 needs to be accurately determined. That is, in the case of determining the power consumption of a particular ECU 116, only a power consumption of the particular ECU 116 may be considered when the particular ECU 116 operates alone. However, when a cooperative control for other ECUs 116 is required during operation of the particular ECU 116, there is a need to consider power consumptions of the other ECUs 116 operating together as well as a power consumption of the particular ECU 116.

Information shown in FIG. 4 and FIG. 5 are for determining OTA availability of the vehicle 100. Information shown in FIG. 4 and FIG. 5 may be obtained, transmitted, and stored under the control of a related controller (ECU) while the vehicle 100 is parked, is in standby, and is driven. That is, information obtained by the related controller (ECU) may be transmitted to the OTA server 170 or the power information server 180 via the communication control unit 134 and stored therein or may be stored in a storage provided in the vehicle 100.

Figure 6:
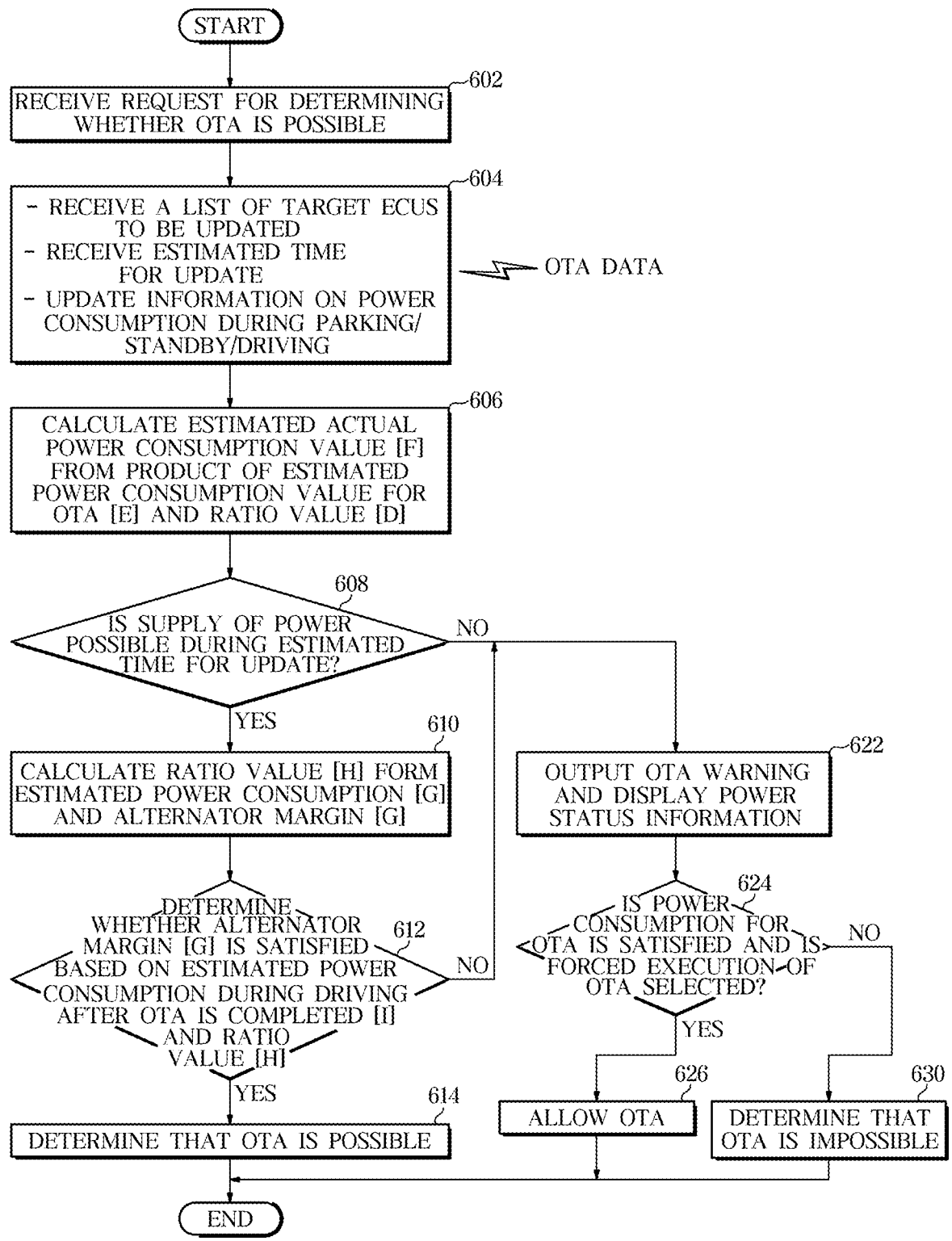
FIG. 6 is a view exemplarily illustrating a method of controlling a vehicle to determine whether a vehicle is configured to perform OTA.

FIG. 6 is a view exemplarily illustrating a method of controlling a vehicle to determine whether a vehicle is able to perform OTA. The method of controlling a vehicle of FIG. 6 may be performed based on the configuration and information as shown in FIG. 1, FIG. 2, FIG. 3, FIG. 4, and FIG. 5. The method of controlling the vehicle of FIG. 6 includes determining whether to enable supply of an electric power higher than a value required to perform an over-the-air (OTA) software update of the vehicle based on a power supply status of the vehicle, and performing the OTA software update of the vehicle upon determining that the supply of the electric power higher than the value required to perform the OTA software update of the vehicle is possible.

The vehicle 100 receives a request for determining whether OTA is possible from the OTA server 170 located at a remote position (602). The request for determining whether the OTA software update is possible is a request generated by the OTA server 170 and transmitted to the vehicle 100 according to various exemplary embodiments of the present invention before performing the OTA software update in the case where software or firmware of at least one ECU 116 provided in the vehicle 100 needs to be updated. The vehicle 100 determines whether the OTA software update is possible in response to the request for determining whether the OTA software update is possible.

As a preparation process for determining the possibility of the OTA software update, the power control unit 132 of the vehicle 100 receives a list of target ECUs 116 of software/firmware updates, receives an estimated time for the software/firmware update, and updates information on power consumptions during parking/standby/driving (604).

The list of target ECUs 116 of software/firmware updates is a list of ECUs 116 that need to be software/firmware updated after now among one or more ECUs 116 provided in the vehicle 100. The list of target ECUs 116 of software/firmware updates is received from the OTA server 170 via the communication control unit 134. The target of software/firmware updates may also include the power control unit 132 and the communication control unit 134 of FIG. 1 may also be updated.

The estimated time for the software/firmware update is a total time expected to be taken for the software/firmware update from now. Information on the estimated time for the software/firmware update is also received from the OTA server 170 via the communication control unit 134.

The information on power consumptions during parking/standby/driving is information on amounts of electric power respectively consumed while the vehicle 100 is parked, is in standby, and is driven. The information on power consumptions during parking/standby/driving may include designed values (estimated values) and actually measured values. The information on power consumptions during parking/standby/driving is received from the OTA server 170 via the communication control unit 134. The 'standby' of the vehicle 100 refers to a case in which a user stays in the vehicle 100 without starting the engine.

The power control unit 132 of the vehicle 100 determines an estimated actual consumption value [F] estimated to be actually consumed when the OTA software update is performed based on the information as described above (606). The estimated actual power consumption [F] may be determined as a product of an estimated power consumption value for OTA [E] and a ratio value [D].

The estimated power consumption value for OTA [E] may be determined as follows. A target ECU 116 of the software/firmware update is search for from the ECU communication/power information 504 of FIG. 5 with reference to the received list of target ECUs 116 of software/firmware updates. Furthermore, while the target ECU 116 of the software/firmware update operates, other ECUs 116 simultaneously activated by communication channel wake-up are searched from the communication channel-specific connected ECU information 506 of FIG. 5. Based on the search results, power consumptions of the corresponding ECU 116, i.e., the target ECU 116 of the software/firmware update, and other ECUs 116 simultaneously activated thereby are summed. This summing operation is performed for each communication channel to determine estimated power consumption value for OTA [E] during parking/standby of the vehicle 100.

The ratio value [D] is a ratio of a designed value to an actually measured value of power consumption of the ECU 116 while the vehicle 100 is parked/in standby. Because the designed value of the power consumption includes a certain level of margin, it may be different from the actually measured value. Therefore, the difference between the designed value and the actually measured value is compensated for by applying the ratio value thereto.

Subsequently, the power control unit 132 identifies whether an electric power corresponding to the estimated power consumption value for OTA [E] may be supplied during the estimated time for the software/firmware update received from the OTA server 170 (608). That is, the power control unit 132 identifies whether a current charge level of the battery 114 is sufficient for the estimated power consumption value for OTA [E].

In the case where the current charge level of the battery 114 is sufficient for the estimated power consumption value for OTA [E] ('Yes' of 608), the power control unit 132 determines a ratio value [H] from estimated power consumption while driving [G] and the alternator margin [g] (610). The ratio value [H] is a ratio of the designed value to an actually measured value of power consumption of the ECU 116 while the vehicle 100 is driven. Because the designed value of the power consumption includes a certain level of margin, it may be different from the actually measured value. Therefore, the difference between the designed value and the actually measured value is compensated for by applying the ratio value thereto.

Subsequently, the power control unit 132 determines an estimated power consumption while driving after OTA of the vehicle 100 is completed [I] and a ratio value [H] and determines whether the alternator margin [g] is satisfied based on the estimated power consumption while driving after OTA of the vehicle 100 is completed [I] and the ratio value [H] (612).

The estimated power consumption while driving after OTA of the vehicle 100 is completed [I] is a power consumption expected to be consumed while the vehicle 100 is driven in a state where the desired software/firmware update of the vehicle 100 is completed from now.

The ratio value [H] is a ratio of the designed value to an actually measured value of power consumption of the ECU 116 while the vehicle 100 is driven. Because the designed value of the power consumption includes a certain level of margin, it may be different from the actually measured value. Therefore, the difference between the designed value and the actually measured value is compensated for by applying the ratio value thereto.

The determining whether the alternator margin [g] is satisfied based on the estimated power consumption while driving after OTA of the vehicle 100 is completed [I] and the ratio value [H] is determining whether a product of the estimated power consumption while driving after OTA of the vehicle 100 is completed [I] and the ratio value [H] is within the alternator margin [g].

In the case where the product of the estimated power consumption while driving after OTA of the vehicle 100 is completed [I] and the ratio value [H] satisfies the alternator margin [g] ('Yes' of 612), the vehicle 100 may be driven by charging the battery 114 via electric generation by the alternator 112 after the OTA software update is completed. In the instant case, it is possible to drive the vehicle 100 even when the OTA software update is performed, and thus it may be determined as 'OTA available' and the OTA software update may be allowed (614). When the OTA software update is allowed upon determining that the OTA software update is available, the OTA software update may be automatically performed in accordance with a predetermined protocol during parking/standby of the vehicle 100.

On the other hand, in the case where the product of the estimated power consumption while driving after OTA of the vehicle 100 is completed [I] and the ratio value [H] does not satisfy the alternator margin [g] ('No' of 612), it is impossible to drive the vehicle 100 by charging the battery 114 via electric generation by the alternator 112 after the OTA software update is completed. In the instant case, the OTA software update makes it impossible to drive the vehicle 100 after the OTA software update, and thus it is preferable not to allow the OTA software update.

Both the case where the product of the estimated power consumption while driving after OTA of the vehicle 100 is completed [I] and the ratio value [H] does not satisfy the alternator margin [g] in operation 612 ('No' of 612), and the case where the current charge level of the battery 114 is not sufficient for the estimated power consumption value for OTA [E] in operation 608 described above ('No' of 608) indicate that the power statuses of the vehicle 100 are not sufficient to perform the OTA software update. Therefore, OTA warning is output and information on the power status of the vehicle 100 is displayed to allow the driver to recognize the power status of the vehicle 100 related to the OTA software update (622).

The case where the current charge level of the battery 114 is not sufficient for the estimated power consumption value for OTA [E] in operation 608 described above ('No' of 608) indicates that the power status of the vehicle 100 is insufficient to perform the OTA software update. On the other hand, the case where the product of the estimated power consumption while driving after OTA of the vehicle 100 is completed [I] and the ratio value [H] does not satisfy the alternator margin [g] ('No' of 612) indicates that the power status of the vehicle 100 is insufficient to drive the vehicle 100 after the OTA software update but sufficient for performing the OTA software update alone. Therefore, when the driver selects forced execution of the OTA software update in a state where an amount of electric power for completing the OTA software update is satisfied ('No' of 612), the power control unit 132 may allow the OTA software update of the vehicle 100 (626).

In the case where the power status does not satisfy an amount of electric power required for the OTA software update or the forced execution of the OTA software update is not selected ('No' of 614), the power control unit 132 determines that it is impossible to perform the OTA software update of the vehicle 100 and does not allow OTA (630).

Accordingly, according to the vehicle and the method of controlling the vehicle according to various exemplary embodiments of the present invention, it is determined whether the supply of an electric power higher than that required to perform the over-the-air (OTA) software update of the vehicle is possible based on a power supply status of the vehicle, and the OTA software update of the vehicle is performed upon determining that the supply of the electric power higher than the value required to perform the OTA software update of the vehicle is possible.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code that may be executed by a computer using an interpreter or the like.

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a vehicle, the method comprising:
   determining a power supply status of the vehicle;
   determining whether to enable supply of an electric power higher than a value required to perform an over-the-air (OTA) software update of the vehicle based on the power supply status of the vehicle; and
   performing the OTA software update of the vehicle upon determining that the supply of the electric power higher than the value required to perform the OTA software update of the vehicle is possible,
   wherein the performing of the OTA software update of the vehicle includes allowing the OTA software update of the vehicle only when forced execution of the OTA software update is selected upon determining that the electric power required to perform the OTA software update of the vehicle is obtained but supply of an additional electric power higher by a predetermined level is impossible.

2. The method of claim 1, wherein the performing of the OTA software update of the vehicle includes allowing an automatic OTA software update of the vehicle upon determining that supply of an additional electric power higher than the value required to perform the OTA software update of the vehicle by a predetermined level is possible.

3. The method of claim 1, further including not performing the OTA software update of the vehicle upon determining that the supply of the electric power required to perform the OTA software update of the vehicle is impossible.

4. The method of claim 1, wherein the determining of the power supply status of the vehicle is performed based on a charge level of a battery of the vehicle and a generated amount of electric power of an alternator.

5. The method of claim 1, wherein the electric power required to perform the OTA software update of the vehicle is determined based on a designed value-based estimated power consumption and an actually measured value-based power consumption of a target device of the OTA software update of the vehicle.

6. The method of claim 5, wherein the actually measured value-based power consumption is determined in a pre-set plurality of temperature sections based on an average battery consumption during parking, an average battery consumption during standby, and an alternator margin of the vehicle.

7. The method of claim 5, wherein the designed value-based estimated power consumption is determined as a product of an estimated power consumption value for OTA and a ratio value and the ratio value is a ratio of a designed value to the actually measured value-based power consumption of the target device while the vehicle is parked or in standby.

8. The method of claim 1, wherein the electric power required to perform the OTA software update of the vehicle includes an amount of electric power consumed when the target device of the OTA software update of the vehicle is driven by updated software after the OTA software update is completed.

9. A vehicle comprising:
   an alternator configured to generate electric power; a battery configured to store the electric power; and
   a controller configured to determine a power supply status of the vehicle, determine whether to enable supply of an electric power higher than a value required to perform an over-the-air (OTA) software update of the vehicle based on the power supply status of the vehicle, and perform the OTA software update of the vehicle upon determining that the supply of the electric power higher than the value required to perform the OTA software update of the vehicle is possible,
   wherein the OTA software update of the vehicle is performed by allowing the OTA software update of the vehicle only when forced execution of the OTA software update is selected upon determining that the electric power required to perform the OTA software update of the vehicle is obtained but supply of an additional electric power higher by a predetermined level is impossible.

10. The vehicle of claim 9, wherein the OTA software update of the vehicle is performed by allowing an automatic OTA software update of the vehicle upon determining that supply of an additional electric power higher than the value required to perform the OTA software update of the vehicle by a predetermined level is possible.

11. The vehicle of claim 9, wherein the controller is configured not to perform the OTA software update of the vehicle upon determining that the supply of the electric power required to perform the OTA software update of the vehicle is impossible.

12. The vehicle of claim 9, wherein the power supply status of the vehicle is determined based on a charge level of the battery of the vehicle and a generated amount of electric power of the alternator.

13. The vehicle of claim 9, wherein the electric power required to perform the OTA software update of the vehicle is determined based on a designed value-based estimated power consumption and an actually measured value-based power consumption of a target device of the OTA software update of the vehicle.

14. The vehicle of claim 13, wherein the actually measured value-based power consumption is determined in a pre-set plurality of temperature sections based on an average battery consumption during parking, an average battery consumption during standby, and an alternator margin of the vehicle.

15. The vehicle of claim 13, wherein the designed value-based estimated power consumption is determined as a product of an estimated power consumption value for OTA and a ratio value, and the ratio value is a ratio of a designed value to the actually measured value-based power consumption of the target device while the vehicle is parked or in standby.

16. The vehicle of claim 9, wherein the electric power required to perform the OTA software update of the vehicle includes an amount of electric power consumed when a target device of the OTA software update of the vehicle is driven by updated software after the OTA software update is completed.

17. A method of controlling a vehicle, the method comprising:
    determining a power supply status of the vehicle;
    determining whether to enable supply of an electric power higher than a value required to perform an over-the-air (OTA) software update of the vehicle based on the power supply status of the vehicle;
    allowing an automatic OTA software update of the vehicle upon determining that supply of an additional electric power higher than a value required to perform the OTA software update of the vehicle by a predetermined level;
    allowing the OTA software update of the vehicle only when forced execution of the OTA software update is selected upon determining that the electric power required to perform the OTA software update of the vehicle is obtained but the supply of the additional electric power higher by the predetermined level is impossible; and
    not performing the OTA software update of the vehicle upon determining that the supply of the electric power required to perform the OTA software update of the vehicle is impossible.

18. A vehicle comprising:
    an alternator configured to generate electric power;
    a battery configured to store the electric power; and
    a controller configured to determine a power supply status of the vehicle, determine whether to enable supply of an electric power higher than a value required to perform an over-the-air (OTA) software update of the vehicle based on the power supply status of the vehicle, allow an automatic OTA software update of the vehicle upon determining that supply of an additional electric power higher than the value required to perform the OTA software update of the vehicle by a predetermined level, allow the OTA software update of the vehicle only when forced execution of the OTA software update is selected upon determining that the electric power required to perform the OTA software update of the vehicle is obtained but the supply of the additional electric power higher by the predetermined level is impossible, and not perform the OTA software update of the vehicle upon determining that the supply of the electric power required to perform the OTA software update of the vehicle is impossible.

* * * * *